US010730736B1

(12) United States Patent
Candler et al.

(10) Patent No.: US 10,730,736 B1
(45) Date of Patent: Aug. 4, 2020

(54) SOAP POP SYRUP SENSOR

(71) Applicants: Kevin M. Candler, Osceola, IN (US); Mark Riddle, Lake in the Hills, IL (US)

(72) Inventors: Kevin M. Candler, Osceola, IN (US); Mark Riddle, Lake in the Hills, IL (US)

( * ) Notice: Subject to any disclaimer, the term of this patent is extended or adjusted under 35 U.S.C. 154(b) by 143 days.

(21) Appl. No.: 15/938,312

(22) Filed: Mar. 28, 2018

Related U.S. Application Data

(60) Provisional application No. 62/524,771, filed on Jun. 26, 2017.

(51) Int. Cl.
   *B67D 1/00* (2006.01)
   *G01V 8/10* (2006.01)

(52) U.S. Cl.
   CPC ......... *B67D 1/0042* (2013.01); *B67D 1/0021* (2013.01); *G01V 8/10* (2013.01)

(58) Field of Classification Search
   CPC ....... B67D 1/0042; B67D 1/0021; G01V 8/10
   USPC .......... 222/23, 65–66, 129.1, 325–327, 399; 99/283; 356/440; 700/231–244, 700/281–282; 73/866.5
   See application file for complete search history.

(56) References Cited

U.S. PATENT DOCUMENTS

| | | | | |
|---|---|---|---|---|
| 4,312,341 A | * | 1/1982 | Zissimopoulos | A61M 5/365 604/67 |
| 5,083,862 A | * | 1/1992 | Rusnak | G01N 21/85 250/574 |
| 5,110,205 A | * | 5/1992 | Suzuki | G01N 33/2852 356/135 |
| 5,452,076 A | * | 9/1995 | Schopper | G01F 23/292 356/128 |
| 5,651,482 A | * | 7/1997 | Sizemore | G07F 13/065 222/129.1 |
| 5,672,887 A | * | 9/1997 | Shaw | A61M 5/365 250/573 |
| 5,749,494 A | * | 5/1998 | Wolski | B67D 1/07 137/240 |

(Continued)

*Primary Examiner* — Paul R Durand
*Assistant Examiner* — Andrew P Bainbridge
(74) *Attorney, Agent, or Firm* — Daniel Tychonievich; Krieg DeVault LLP

(57) ABSTRACT

A system for sensing empty soft drink syrup containers in a soda pop dispensing arrangement is provided that includes at least one soft drink syrup container; a mixing station for mixing water and $CO_2$ with soft drink syrup to make a soda pop mixture; a pump for pumping soft drink syrup to the mixing station and beyond to be dispensed; a $CO_2$ container providing $CO_2$ gas; and a soda pop dispenser apparatus. The system also includes a first tubing transmission line extending between the soft drink syrup container and the pump for carrying soft drink syrup, a second tubing transmission line for carrying soft drink syrup between the pump and the mixing station, and a third tubing transmission line extending between the mixing station and the soda pop dispenser for carrying soda pop to be dispensed. An optic sensor is located and spliced in the first tubing transmission line for sensing when the first tubing transmission line is devoid of soft drink syrup, and a signal indicator electrically connected with the optic sensor provides a signal indicating when the first tubing transmission line is devoid of syrup.

13 Claims, 14 Drawing Sheets

(56) References Cited

U.S. PATENT DOCUMENTS

| | | | | |
|---|---|---|---|---|
| 6,142,340 A | * | 11/2000 | Watanabe | B67D 1/0007 222/129.3 |
| 6,672,200 B2 | * | 1/2004 | Duffy | A47J 31/0642 222/146.5 |
| 7,482,818 B2 | * | 1/2009 | Greenwald | A61M 1/3626 324/639 |
| 7,656,533 B2 | * | 2/2010 | Kang | G01N 21/05 356/436 |
| 7,991,510 B2 | * | 8/2011 | Duan | G01F 1/667 700/282 |
| 8,594,900 B2 | * | 11/2013 | Couch | B60C 23/20 701/29.1 |
| 2012/0074168 A1 | * | 3/2012 | Newman | B67D 1/0022 222/129.4 |
| 2020/0024119 A1 | * | 1/2020 | McDougall | B67D 1/1247 |

* cited by examiner

SOAP POP SYRUP SENSOR

This application claims priority from U.S. Provisional Patent Application Ser. No. 62/524,771 filed on Jun. 26, 2017, the entirety of which is incorporated by reference herein.

BACKGROUND OF THE INVENTION

The subject invention relates to a system for sensing empty soft drink syrup containers in a dispensing manifold, and in particular, to a system that utilizes optic sensors located in the syrup transmission lines. The optic sensors are connected to an indicator to notify users of the dispensing manifold that a syrup container has emptied before the transmission line has run completely dry.

Dispensing manifolds for dispensing soft drink syrup to a user end station containing a nozzle or dispensing device for dispensing the syrup, after being mixed with carbonated water, are well known. The systems are widely used in the restaurant, bar, and convenient store industries, for example. In such a system, a plurality of soft drink syrup containers or boxes are placed on a rack or shelves and nozzles on the syrup container boxes are connected to transmission lines using suitable fittings. A pump, which may be $CO_2$ or air compressor driven, moves the syrup along the transmission line where it is mixed with water and carbon dioxide ($CO_2$) to then be pumped to the dispensing system or a nozzle where drink glasses or pitchers may be filled with the carbonated beverage. The dispensing system or stations may be fixed in a dispensing unit including activators to activate the dispensing of the carbonated beverage. Each of the different beverages may have a separate actuator, which can be activated, for example, by pressing a drink glass or pitcher to be filled thereagainst. Alternately, hand held dispensing nozzles are widely used that include a plurality of buttons whereby the operator selects the button or the desired carbonated beverage and pulls the activation trigger.

One problem with such syrup manifold dispensing systems is when one of the syrup dispensing container boxes becomes empty. This is a problem because the syrup line may run empty, and if the operator is not paying attention, a number of beverages and/or mixed drinks may be dispensed and served to customers without realizing that only carbonated water was being dispensed and not the carbonated soft drink intended. Additionally, there will be a down time until the box is replaced wherein the beverage of which the soft drink associated with syrup container box that has become empty is unable to be served. That is, after someone realizes that a syrup box is empty, time must be found to have someone replace the empty box with a full one and hook it to the transmission lines by replacing the fittings onto the box. Then, additionally, there is the time for the syrup in the new container box to be pumped to the mixing and dispensing unit. As transmission lines can be very long, (some may be several dozen feet long) there is additional time for the syrup to be pumped back to the mixer and dispenser. Additionally, when a line has been emptied, the $CO_2$ pump may continue to cycle causing the $CO_2$ tank associated therewith to empty out, so there is the time and cost associated with replacing the $CO_2$ supply.

Accordingly, an object of the subject invention to provide operators of dispensing unit with a notification that a soft drink syrup container has run empty before the transmission line completely empties of the syrup, thereby delivering only carbonated water.

SUMMARY OF THE INVENTION

In one embodiment of the invention, a system for sensing empty soft drink syrup containers in a soda pop dispensing arrangement is provided that includes at least one soft drink syrup container; a mixing station for mixing water and $CO_2$ with soft drink syrup to make a soda pop mixture; a pump for pumping soft drink syrup to the mixing station and beyond to be dispensed; a $CO_2$ container providing $CO_2$ gas; and a soda pop dispenser apparatus. The system also includes a first tubing transmission line extending between the soft drink syrup container and the pump for carrying soft drink syrup, a second tubing transmission line for carrying soft drink syrup between the pump and the mixing station, and a third tubing transmission line extending between the mixing station and the soda pop dispenser for carrying soda pop to be dispensed. An optic sensor is located and spliced in the first tubing transmission line for sensing when the first tubing transmission line is devoid of soft drink syrup, and a signal indicator electrically connected with the optic sensor provides a signal indicating when the first tubing transmission line is devoid of syrup. The system also includes a DC power supply; and a control unit electrically connected to the optic sensor and the signal indicator providing a voltage from the DC power supply.

The system may contain a plurality of soft drink syrup containers, pumps, and optic sensors in a manifold system so that a variety of soda pops can be dispensed from the soda pop dispenser.

In one embodiment, the optic sensor includes a hollow housing and a sensor portion mounted in the housing, and the housing is mounted at an angle to the horizontal. The housing has an inlet end, which receives soft drink syrup from the soft drink syrup container. The inlet end is located higher relative to the horizontal than an outlet end of the housing wherein soft drink syrup exits the housing to be carried to the pump. The housing can be mounted at an angle between 20° and 70° relative to the horizontal, and in one embodiment is mounted at an angle of 30° to 60° from the horizontal. In a preferred embodiment, the housing is mounted at an angle of approximately 45° from the horizontal.

In one embodiment, the housing has a hollow generally cylindrical configuration including an outer wall and an inner wall, and the sensor portion is threaded into an opening extending through the inner and outer walls of the housing so that the sensing end of the sensor portion is exposed to soft drink syrup contained in the hollow of the housing.

In a preferred embodiment, at least a portion of the first tubing transmission line extending between the optic sensor and the pump is lower relative to the horizontal than the outlet end of the housing and the pump.

In one embodiment, the system for sensing empty syrup containers in a soda pop dispensing arrangement includes two signal indicators, one local signal indicator being located near and in view of the optic sensor and a second remote signal indicator being located near and in view of the soda pop dispenser.

In another embodiment of the invention, the system includes a plurality of signal indicators, one local signal indicator located near and connected to a respective optic sensor for indicating when the respective soft drink syrup container is empty. The system also can include at least one remote signal indicator located near and in view of the soda pop dispenser to provide a user of the dispenser with notice that at least one of the soft drink syrup containers is empty. At least some of the signal indicators can be LED lights.

The system can include a $CO_2$ driven pump with CO2 provided from the $CO_2$ container, and a $CO_2$ gas line extends therebetween.

In another aspect of the invention, a method is provided for sensing empty soft drink syrup containers in a soda pop dispensing arrangement that includes the steps of providing at least one soft drink syrup container; providing a mixing station for mixing water and $CO_2$ with soft drink syrup to make a soda pop mixture; providing a pump for pumping soft drink syrup to the mixing station and beyond to be dispensed; providing a $CO_2$ container to provide $CO_2$ gas; and providing a soda pop dispenser. The method also includes providing a first tubing transmission line extending between the soft drink syrup container and the pump for carrying soft drink syrup, a second tubing transmission line for carrying soft drink syrup between the pump and the mixing station, and a third tubing transmission line extending between the mixing station and the soda pop dispensing apparatus for carrying soda pop to be dispensed. The method further includes providing an optic sensor; splicing the optic sensor in the first tubing transmission line for; providing a signal indicator; electrically connecting the optic sensor with the signal indicator; providing a DC power supply; providing a control unit; electrically connecting the optic sensor and the signal indicator to the DC power supply through the control unit; sensing when the first tubing line is devoid of soft drink syrup using the optic sensor; and signaling with the signal indicator when the first tubing line is devoid of syrup.

The method can include a plurality of soft drink syrup containers, pumps and optic sensors in a manifold system so that a variety of soda pops may be dispensed from the soda pop dispenser.

In one embodiment of the method, the optic sensor includes a hollow housing and a sensor portion mounted in the housing, and further includes the step of mounting the housing at an angle to the horizontal. The method can further include the step of locating an inlet end of the housing, which receives soft drink syrup from the soft drink syrup container, higher relative to the horizontal than an outlet end of the housing wherein soft drink syrup exits the housing to be carried to the pump.

The method can also include locating at least a portion of the first tubing transmission line extending between the optic sensor and the pump at a lower level relative to the horizontal than the outlet end of the housing and the pump.

In another aspect of the invention, the method for sensing empty soft drink syrup containers in a soda pop dispensing arrangement includes the steps of providing a plurality of signal indicators, one local signal indicator located near and connected to each respective optic sensor; the respective signal indicator indicating when the associated soft drink syrup container is empty; providing at least one remote signal indicator located near and in view of the soda pop dispenser; and the remote signal indicator indicating when any of the soft drink syrup containers is empty.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
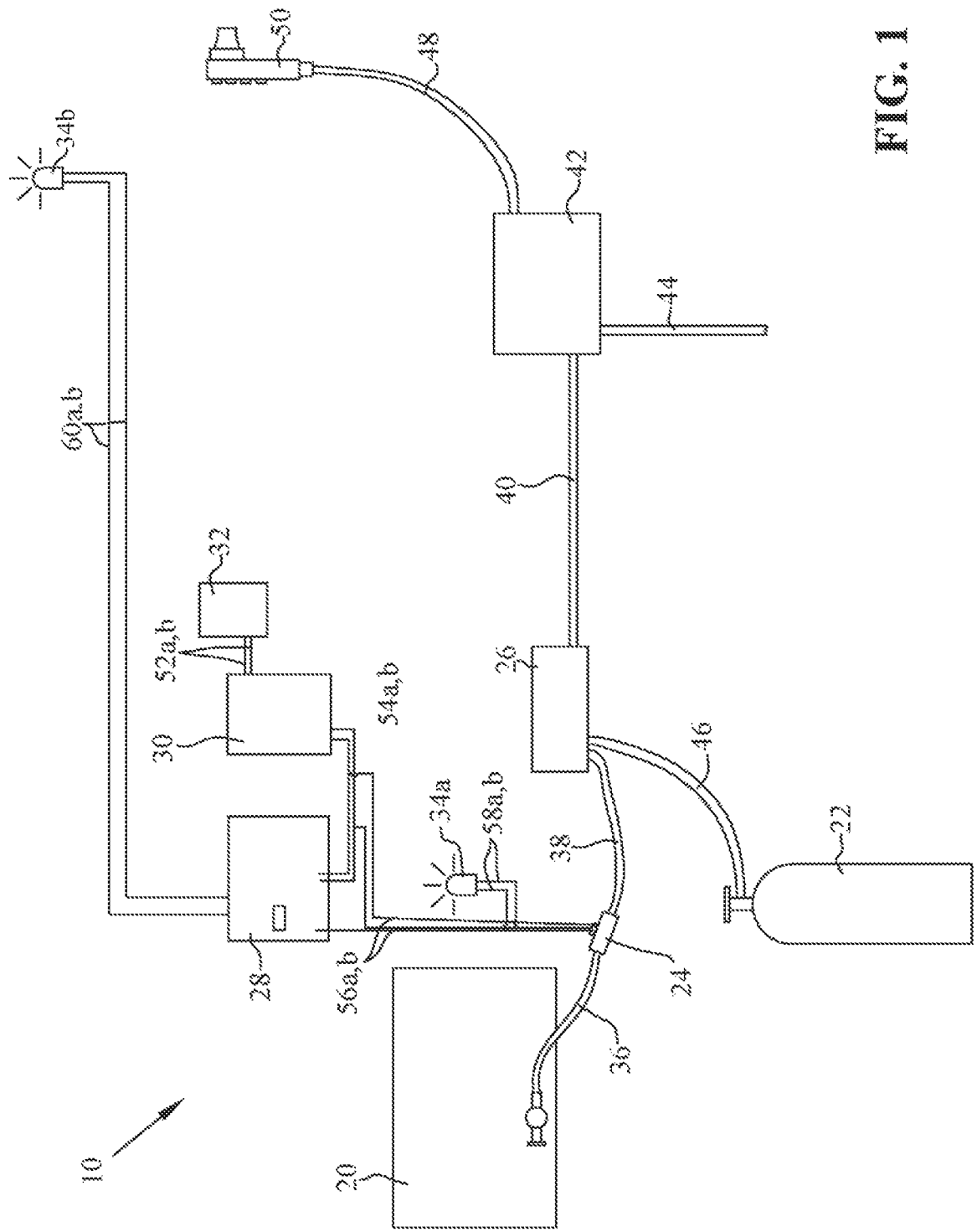
FIG. 1 is a schematic diagram of a system for sensing empty soft drink syrup containers in a soda pop dispensing arrangement in accordance with one embodiment of the subject invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Referring now to FIG. 1, a system for dispensing liquid from one or more syrup containers that may be contained in a dispensing manifold and sensing when one or more of the soft drink syrup containers is empty is shown generally indicated as 10. FIG. 1 is a simplified schematic showing one soft drink syrup container and sensor for simplicity, but as shown and described in subsequent figures and discussed below, the system will often be used with a manifold system containing numerous soft drink dispensing syrup containers and sensors. In the embodiment shown, system 10 includes a soft drink syrup container 20, a $CO_2$ container or tank 22, an optic sensor, 24, a $CO_2$ driven pump 26, a control or circuit unit/panel 28, a DC power supply 30, electrical power supply 32, and signal indicators 34a, 34b to indicate when soft drink syrup container 20 has run out of syrup. System 10 also includes a soft drink syrup transmission line 36 extending between syrup container 20 and optic sensor 24, a soft drink syrup transmission line 38 extending between optic sensor 24 and $CO_2$ driven pump 26, a soft drink syrup transmission line 40 extending between $CO_2$ driven pump 26, and a mixing station 42 wherein soft drink syrup is mixed with water received through a water line 44 and $CO_2$ from tank 22 for carbonation. A $CO_2$ gas line 46 supplies $CO_2$ to pump 26. System 10 also includes a soda pop transmission line 48 and a dispenser or soda pop gun 50 for use in dispensing soda pop into a glass or pitcher (not shown).

System 10 also includes numerous electrical lines for operation of the sensing system. Electrical wires 52a and 52b extend between electrical power supply 32 to DC power supply 30, and leads 54a, 54b extend between DC power supply 30 and control panel 28. Electrical leads or wires 56a, 56b extend from control panel 28 to optic sensor 24. Electrical leads 34a connect signal indicator 34a to the system and electrical leads 60a, 60b connect single signal indicator 34b to control panel 28. In the embodiment shown in FIG. 10, signal indicator 34a is located in close proximity to optic sensor 24 and soft drink syrup container 20, whereas signal indicator 34b is located close to and in view of soda pop dispenser 50 so that a user of the dispenser can be made aware that syrup container 20 has emptied before soda pop from the container is emptied through lines 38, 40 and 48. Signal indicators 34a, 34b may be LED lights, other types of lights, and/or a speaker to provide an audible alarm.

It should be appreciated that the soda pop delivery system portion of system 10 is well known in the art. That is, soft drink syrup container 20, $CO_2$ tank 22, $CO_2$ driven pump 26, mixing station 42 and soda pop dispenser 50, as well as all relines connecting these components are well known to a person skilled in the art.

Figure 2:
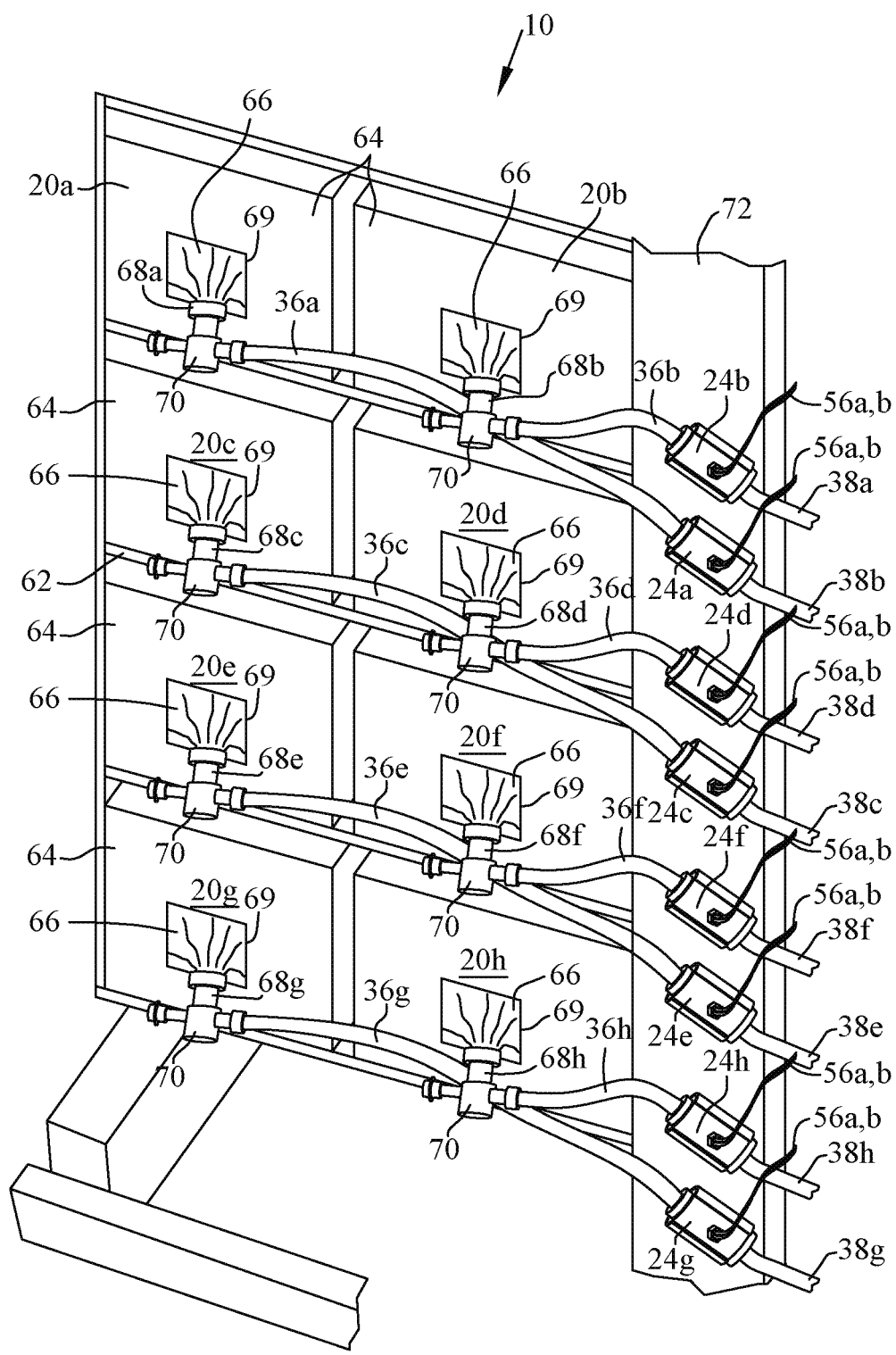
FIG. 2 is a perspective view of a rack holding multiple soft drink syrup container boxes connected to sensors for sensing when a syrup container is empty.

Now referring to FIG. 2, an enlarged view of a multi-soft drink container syrup manifold system and multiple optic sensors associated with system 10 is shown. In the embodiment shown, system 10 includes eight soft drink syrup containers 20a-20h, which are mounted and held in a rack 62 as is well known. Syrup containers 20a-20h each contains an outer cardboard box 64, which houses a flexible bladder 66 in which soft drink syrup is contained. A nozzle 68 is affixed to the end of each bladder 66 wherein soft drink syrup can be dispensed into syrup lines 36. As should be appreciated, each cardboard container box 64 contains an opening 69 through which nozzles 68 protrude. Connecting fittings 70 are provided to connect nozzles 68 to soft drink syrup transmission lines 36a-36h, respective to containers 20a-20h. Soft drink syrup lines 36a-36h are connected to respective optic sensors 24a-24h, which are mounted on a frame 72, which has amounting surface that runs in a substantially vertical orientation. Frame 72 may be of any suitable material and construction configured to mount the optic sensors on. Optic sensors 24a-24h are mounted on frame 72 at an angle to the horizontal, which facilitates sensing whether or not there is syrup in lines 36a-36h as discussed in further detail below. Electrical leads 56a, 56b extend from each sensor and are connected to control panel 28.

Figure 3:
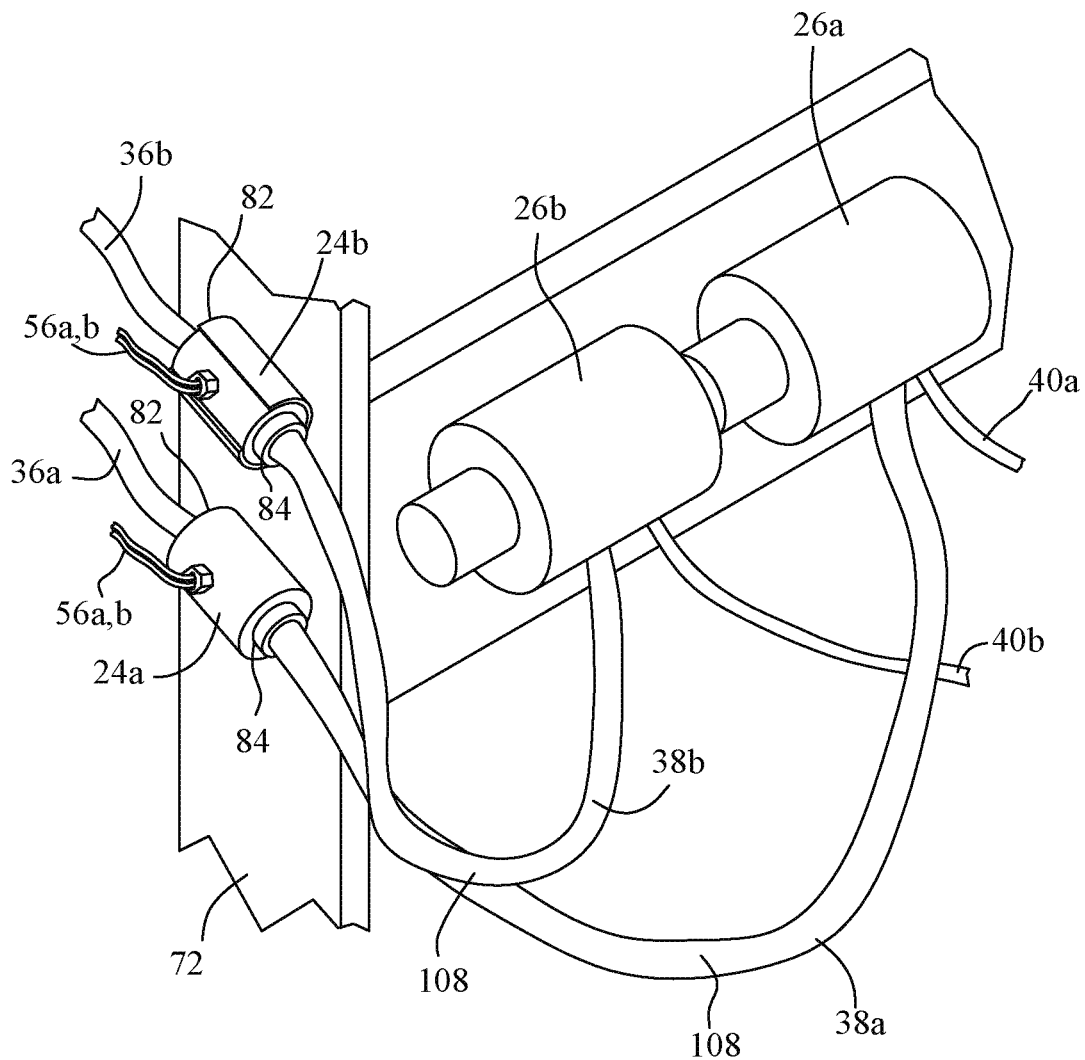
FIG. 3 is a perspective view of two sensors and pumps in a dispensing manifold.

Now referring to FIG. 3, in an enlarged view of two optic sensors 24a and 24b mounted to frame 72 at an angle to the horizontal with soft drink syrup transmission lines 38a and 38b from respective optic sensors feeding into respective CO2 pumps 26a, 26b. Syrup is pumped to mixing station 42 through outlet syrup transmission lines 40a, 40b from respective $CO_2$ driven pumps 26a, 26b.

Figure 4:
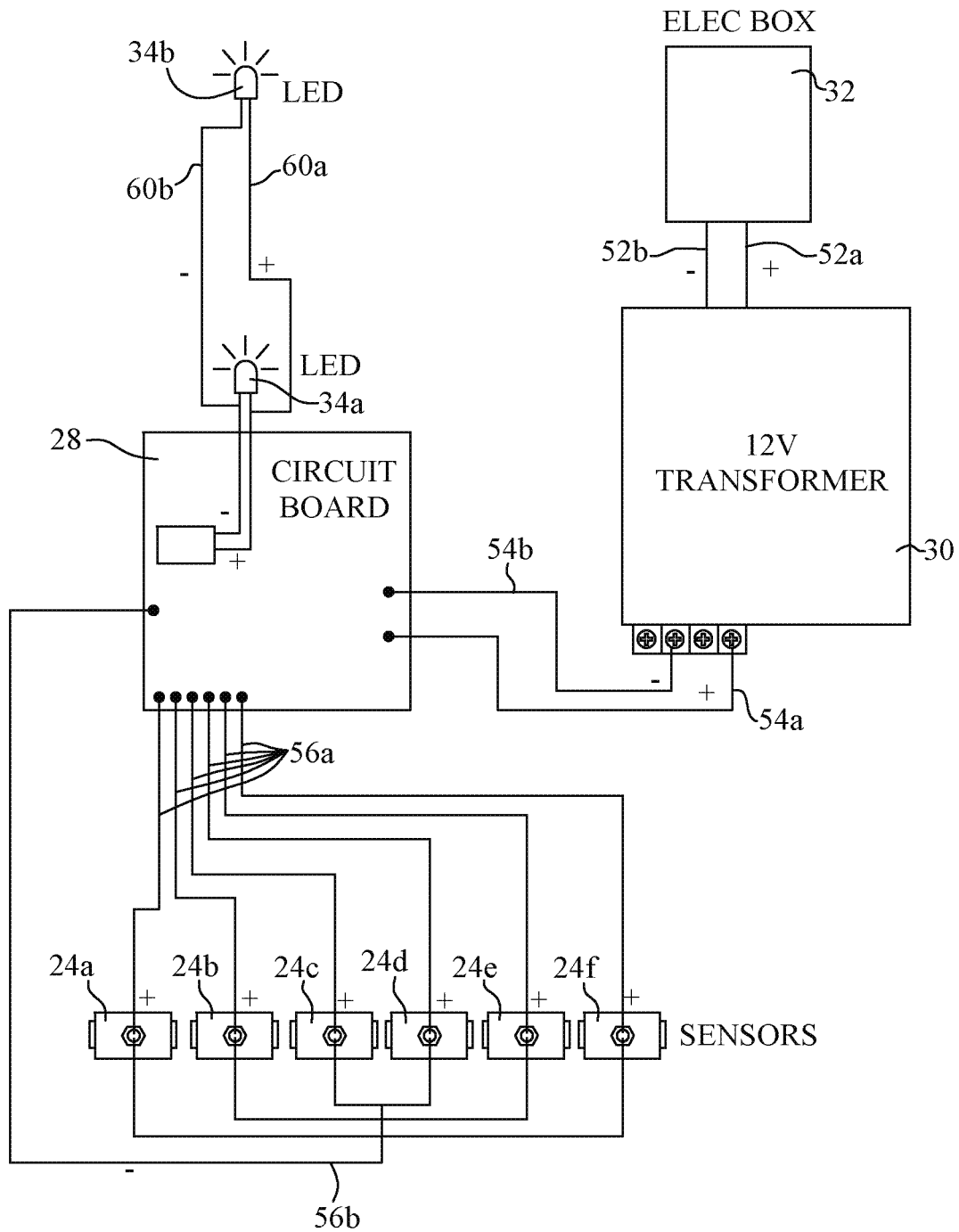
FIG. 4 is a schematic drawing of a circuit board and power supply for the system.
Figure 5:
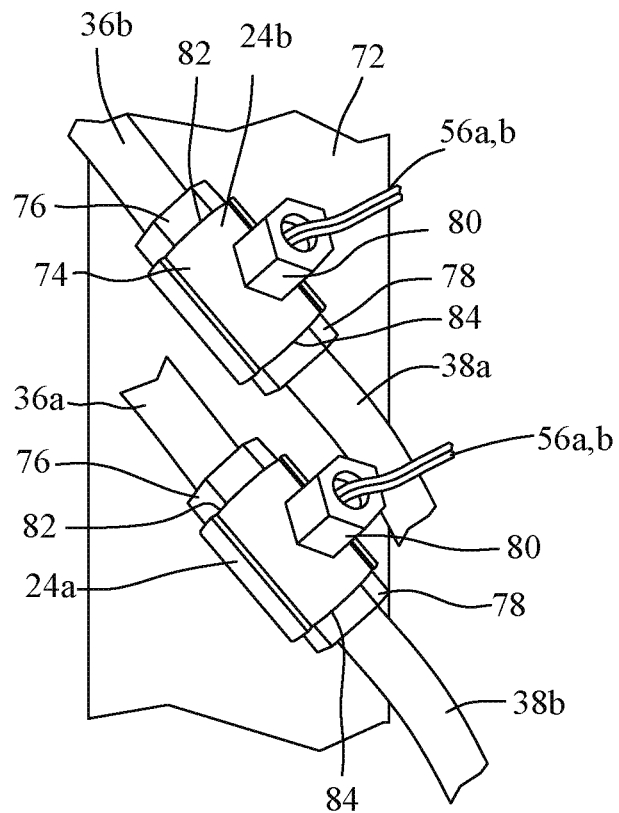
FIG. 5 is an enlarged view of two of the sensors mounted in the system.
Figure 6:
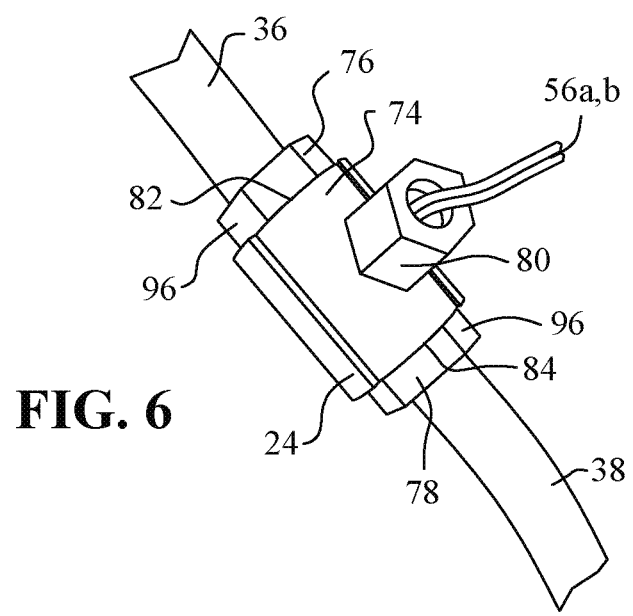
FIG. 6 is an enlarged view of a single sensor in the system.
Figure 7:
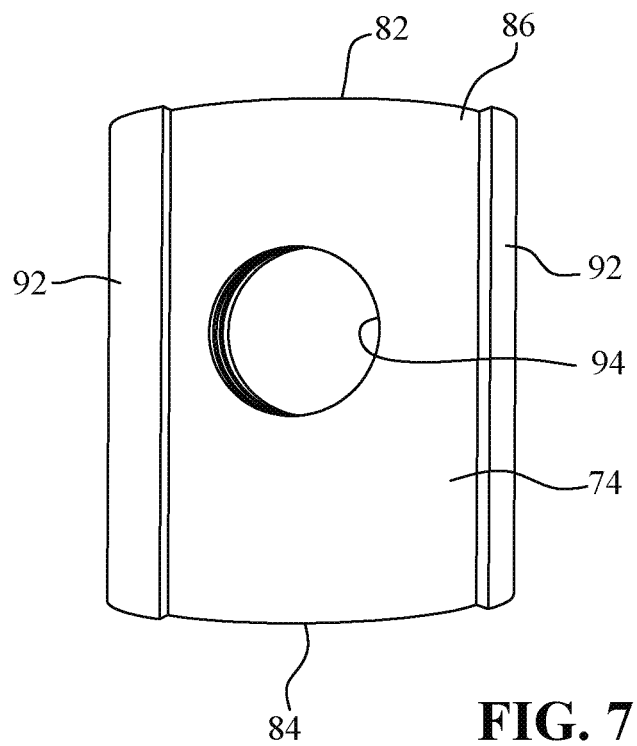
FIG. 7 is a plan view of a sensor housing removed from the system.
Figure 8:
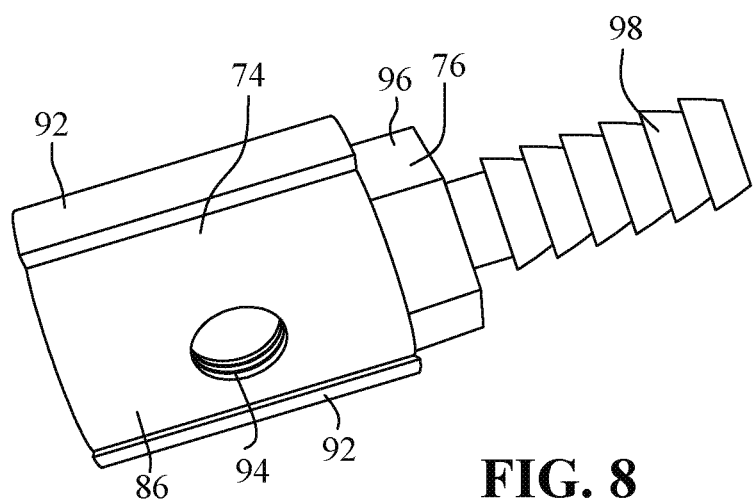
FIG. 8 is a perspective view of the sensor housing and fitting for attachment to the transmission lines.

Referring now to FIG. 4, in an enlarged schematic view of the electrical circuit diagram and control box of FIG. 1 for system 10 is shown.

Referring now to FIGS. 5-11, details of the optic sensors of system 10 are provided. Each optic sensor 24 includes a hollow housing 74, an inlet fitting 76, an outlet fitting 78, and a sensor portion 80. Housing 74 has a generally cylindrical pipe-like configuration and is open at each end 82 and 84. Housing 74 also includes an external wall 86 and an internal wall 88 having threads 90 therein to facilitate attachment of fittings 76 and 78. Housing 74 also includes a pair of lugs 92 extending from external wall 86 to facilitate holding and rotating the housing 24. Housing 74 also includes a threaded opening 94 extending between outer wall 86 and inner wall 88 for receipt of sensor portion 80. One suitable optical sensor for use in the subject convention is supplied by GEMS Sensors and Controls, ELHS-950 series.

Fittings 76 and 78 are identical and of a configuration well known in the embodiment shown. Each fitting includes an externally threaded end (not shown), which is received in housing 74 and held thereto by being threaded with threads 90. Each fitting 76, 78 also includes a hexagonal portion 96 for use in grabbing the fittings by hand or turning with a wrench to thread and unthread the fittings into housing 74. On the end of fittings 76 and 78, opposite the end threaded into housing 74, a barbed nozzle is provided 98 to facilitate receipt of and hold respective syrup soft drink syrup transmission lines 36 and 38, pressed on thereabout (see FIGS. 8 and 5-6).

Figure 9:
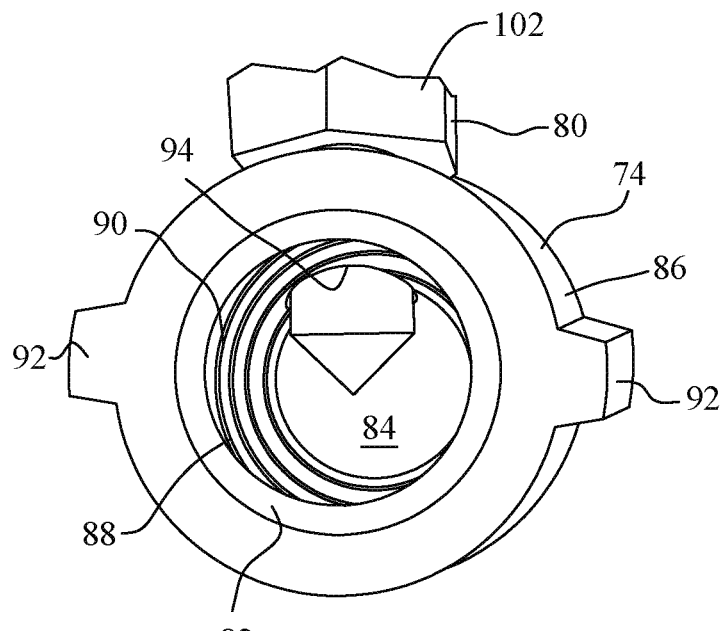
FIG. 9 is a perspective end view showing a sensor mounted in and extending into the interior of the sensor housing.
Figure 10:
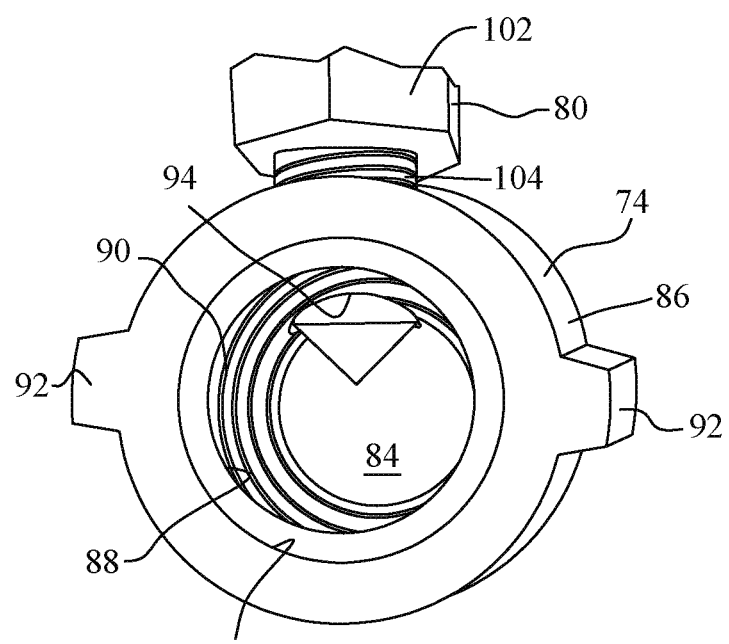
FIG. 10 is another view showing a sensor partially screwed into the housing.
Figure 11:
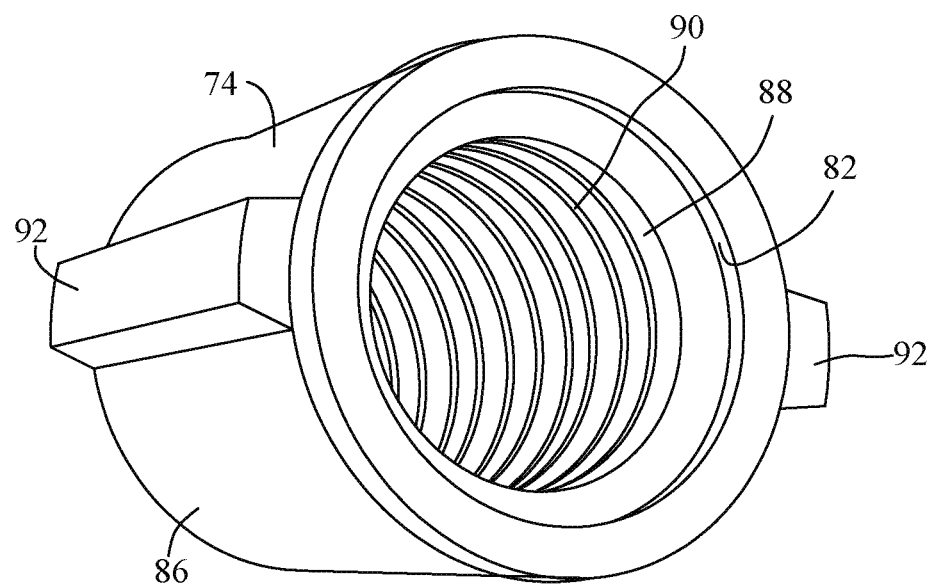
FIG. 11 is an end perspective view showing internal threads on an internal wall of the sensor housing.

Referring to FIGS. 9 and 10, additional details of sensor portion 80 are provided. Each sensor portion 104 includes a hexagonal gripping portion 102, a threaded portion 104 extending from hexagonal portion 102 and threaded into the threads in opening 94 of housing 74. As should be appreciated, hexagonal portion 102 of sensor portion 80 can be used to grab and turn by hand or with a wrench to facilitate threading of the sensor into opening 94 of housing 74. A sensing end 106 is located inside housing 74 and protrudes through inner walls 88. As will be discussed in further detail below, sensor end 106 can be used to detect whether or not soft drink syrup (regardless of color) is flowing through the housing and transmission lines 36, 38.

Figure 12:
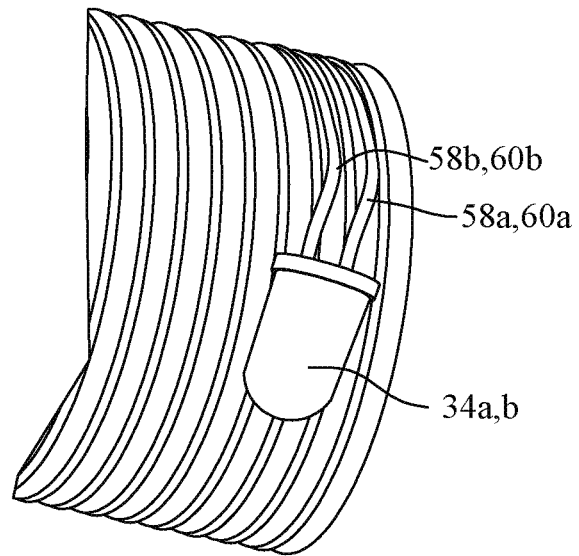
FIG. 12 is a view of a warning light that serves as an indicator when a soft drink syrup container is empty.
Figure 13:
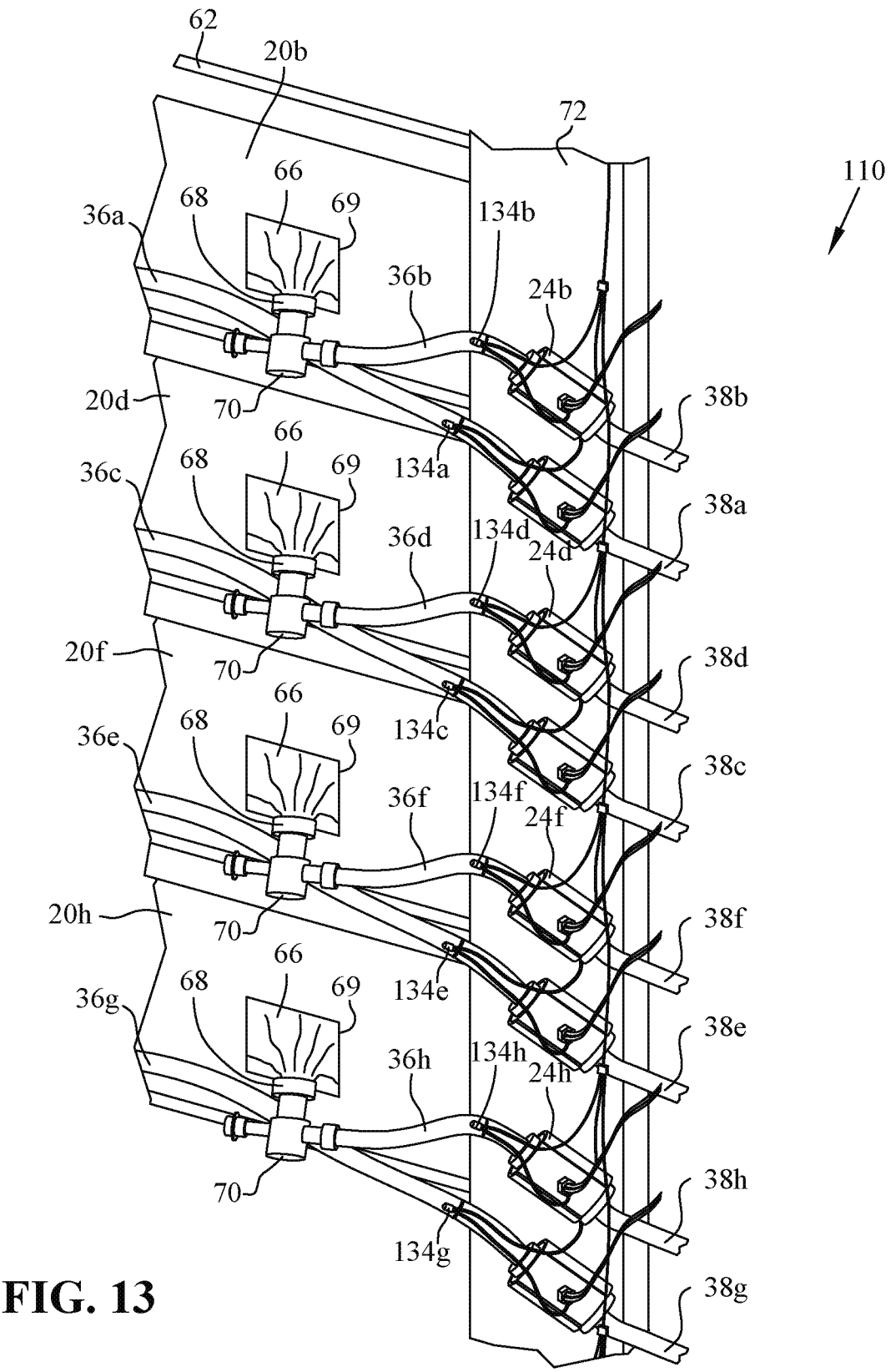
FIG. 13 is a perspective view of an alternative embodiment of a sensing system with sensors for sensing when a syrup container is empty.
Figure 14:
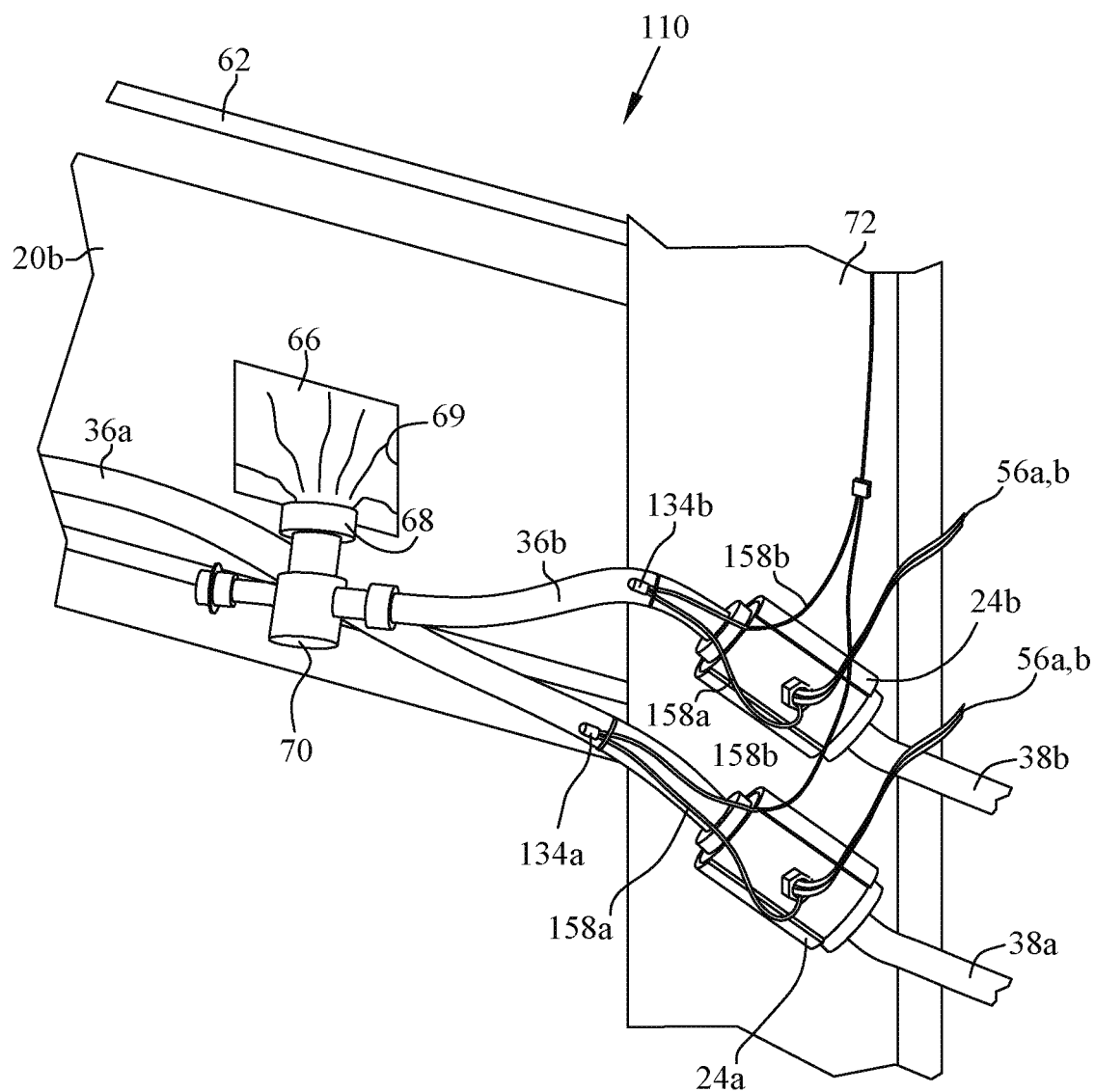
FIG. 14 is an enlarged view of two of the sensors of the alternate embodiment mounted in the system.

Referring now to FIG. 12, one embodiment of a signal indicator 34a, or 34b is shown as an LED light. Upon sensing that the internal cavity defined by internal wall 88 of housing 74 is devoid of a liquid, the signal indicator will light to alert a user of system 10 that at least one container 20 has emptied of its soft drink syrup.

As should be appreciated by one skilled in the art, with the syrup dispensing and sensing system 10, syrup contained in flexible bladders 66 of containers 20 will flow through nozzles 68 into respective soft drink syrup transmission lines 36 where it will proceed through optic sensors 24 and into and out of $CO_2$ driven pumps 26 as driven thereby. Pumps 26 will pump the soft drink syrup through transmission lines 40 to mixing station 42 whereby it will be mixed with the water from line 44 and $CO_2$ from tank 22. From there, the carbonated mixed soft drink/soda pop travels through soda pop dispenser transmission lines 48 to be dispensed out of soda pop dispenser 50. At a time when one of the flexible bladders 66 becomes emptied of the soft drink syrup contained therein or so low that there is a breach in the flow of syrup through lines 36a-36h and respective optic sensors 24a-24h, sensing end 106 of sensor portions 80 will observe and detect the absence of a liquid, thereby creating an event indicated by a change in voltage across leads 56a, 56b to activate signal indicators 34a, 34b (i.e. light up) to alert the user of the system that a container 20 has emptied. This allows the empty soft drink syrup container 20 to be changed with a new full soft drink syrup container 20 before transmission lines 40 and 48 have completely emptied out so that disruption in service/restart time is minimized and thereby preventing the filling of glasses or pitchers with carbonated water devoid of soft drink syrup.

Through revelation and experimentation, it was determined that an important feature of the invention was to have optic sensors 24 set at an angle to the horizontal as shown in FIGS. 2 and 3. Accordingly, inlet ends 82 of optic sensor 24 are set higher than outlet ends 84 (i.e. housing 74 angles downward from inlet ends 82 to outlet ends 84). An angle of approximately 45° from horizontal has been found to work very well; however, this angle may be varied somewhat and still provide efficient sensing of soda pop syrup in the transmission lines of system 10. Another important feature of the invention is to have a trap area 108 in syrup lines 38 extending between optic sensors 24 and pumps 26 (see FIG. 3). Trap area 108 consists of downwardly extending or u-shaped portion of 38 so that the area of the line in the trap 108 is lower than the outlet end 84 of optic sensors 24 and the respective pump 26. This prevents a backflow of syrup from the pump 26 giving a false indication that container 20 has not yet emptied when in fact it has.

Referring now to FIGS. 13-16, an alternate embodiment of a system for sensing empty soft drink syrup containers in a soda pop dispensing manifold is shown generally indicated as 110. System 110 is similar in most respects to system 10 but includes an alternate embodiment control panel or unit 128 (see FIG. 16) and includes a plurality of separate and distinct local signal indicators 134a-134h, one each in association with optic sensors 24a-24h, respectively.

Figure 15:
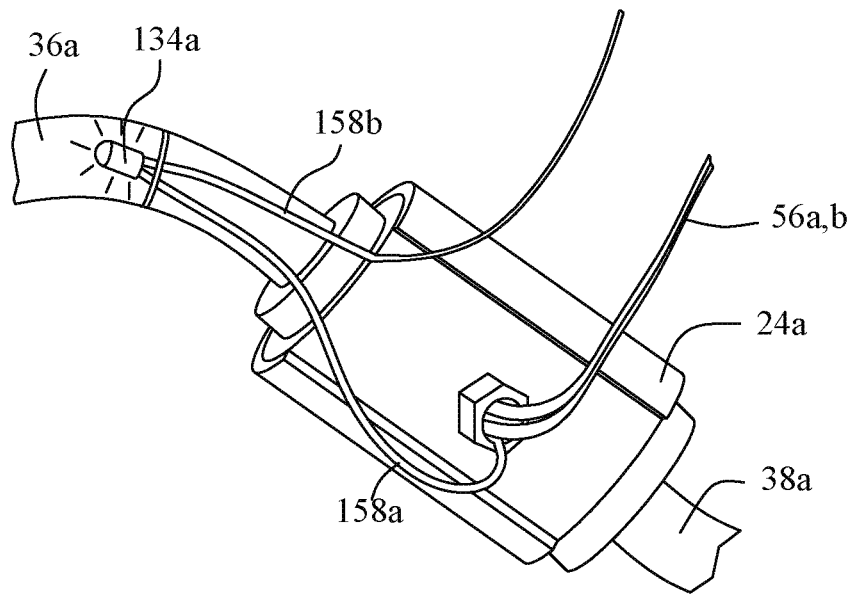
FIG. 15 is an enlarged view of a single sensor in the alternate embodiment system.
Figure 16:
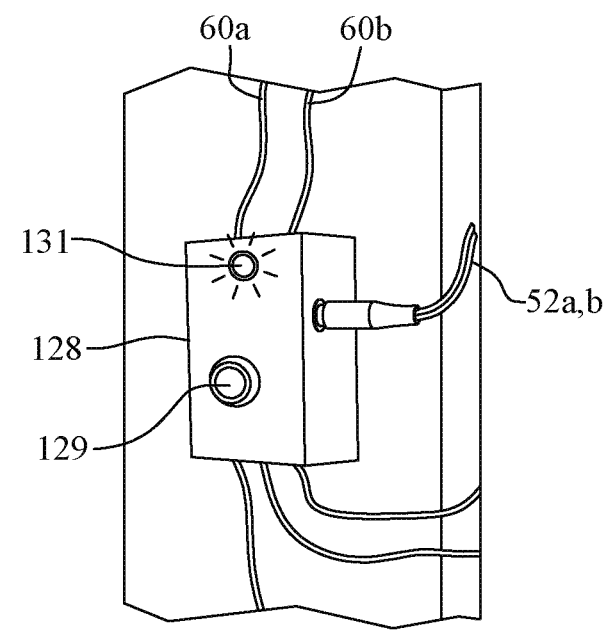
FIG. 16 is power supply and electronic controls for the alternate embodiment system.

As best shown in FIGS. 15 and 16, local indicator lights 134a-134h each have one electrical lead 158a from the respective sensor 24a-24h and a common electrical lead 158b. Accordingly, when any optical sensor 24a-24h detects a condition of no soft drink syrup in the respective line/sensor, the remote signal indicator light 34b will be activated regardless of which soft drink syrup container 20a-20h is empty, but only the respective local signal indicator 134a-134h, associated with of the empty container 20 will light. In this manner, when a user of soda pop dispenser 50 observes the remote indicator being activated, and someone is sent to exchange the empty soft drink syrup container 20 with a full soft drink syrup container, it will be readily evident from the lit local signal indicator light 134a-134h, which soft drink syrup container or containers 20a-20h needs to be replaced.

Figure 17:
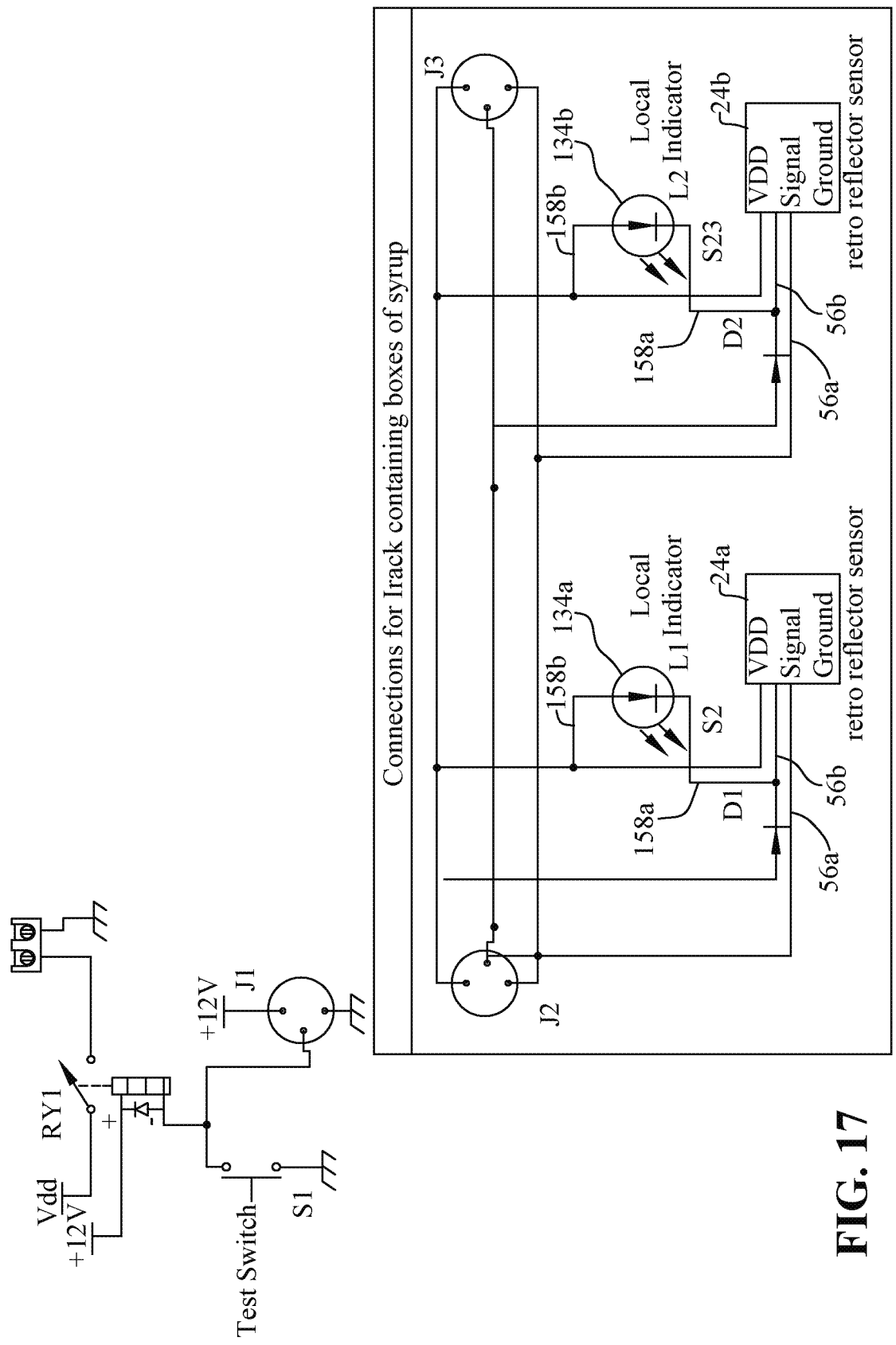
FIG. 17 is an electrical schematic diagram of the sensing system of the alternate embodiment for a rack containing two boxes of syrup.
Figure 18:
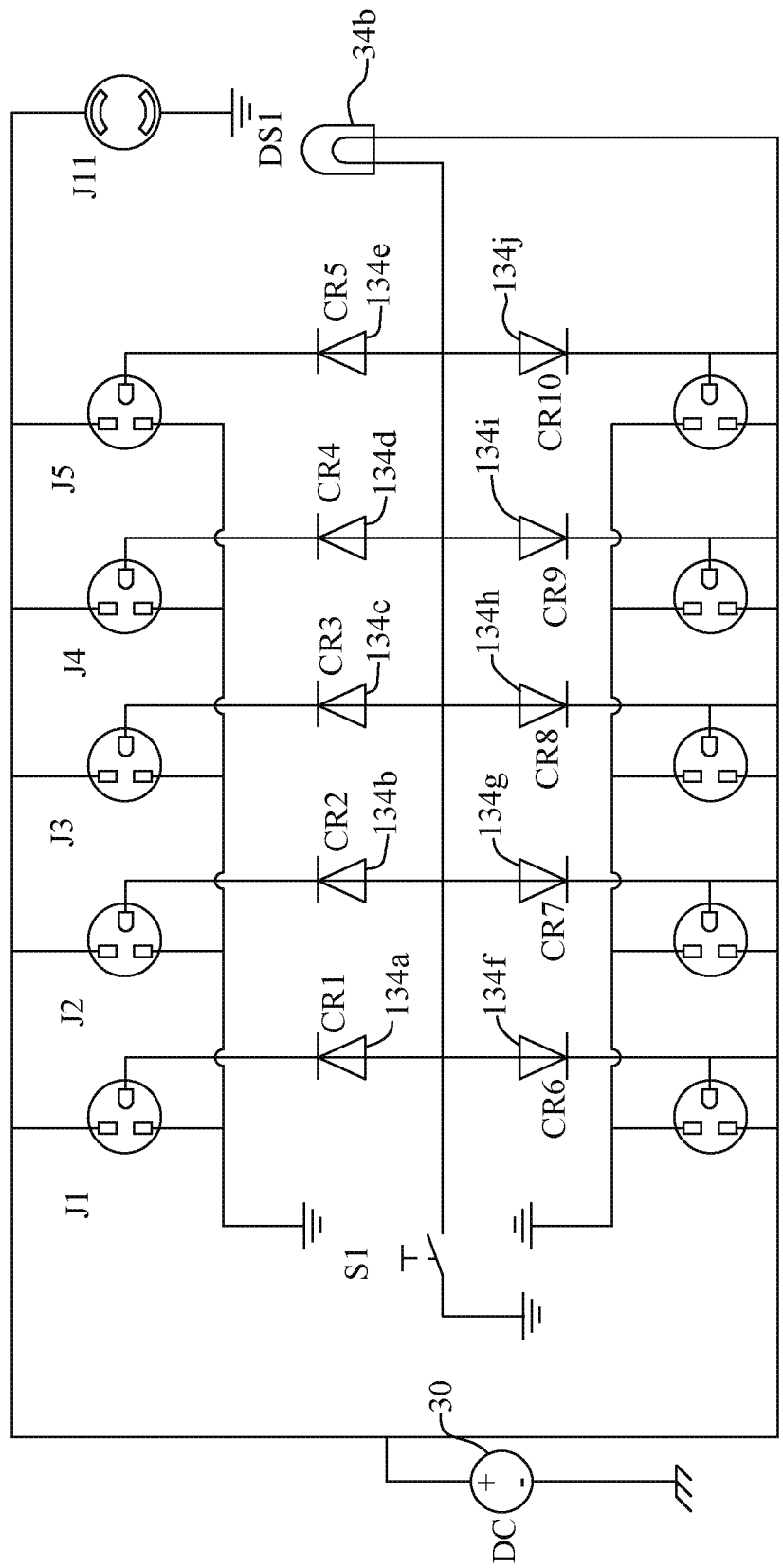
FIG. 18 is another electrical schematic diagram of the sensing system for a rack containing multiple boxes of syrup.
Figure 19:
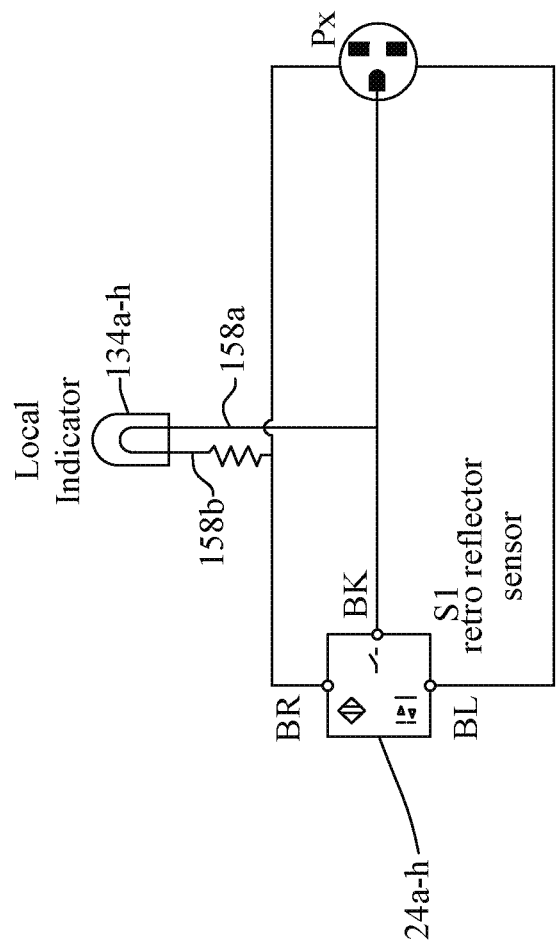
FIG. 19 is an electrical schematic of a local indicator for a sensor.

Electrical schematic diagrams of the system are shown in FIGS. 17-19 with corresponding reference numbers.

While the invention has been taught with specific reference to these embodiments, one skilled in the art will recognize that changes can be made in form and detail without departing from the spirit and scope of the invention. For instance, although the embodiment shown and described above utilizes an optic sensor, the system may be used with other types of sensors for sensing when a syrup transmission line is empty. Therefore, the described embodiments are to be considered in all respects only as illustrative and not restrictive. As such, the scope of the invention is indicated by the following claims rather than by the description.

The invention claimed is:

1. A system for sensing empty soft drink syrup containers in a soda pop dispensing arrangement comprising:
    at least one soft drink syrup container;
    a mixing station for mixing water and $CO_2$ with soft drink syrup to make a soda pop mixture;
    a pump for pumping soft drink syrup to the mixing station and beyond to be dispensed;
    a $CO_2$ container providing $CO_2$ gas;
    a soda pop dispenser apparatus;
    a first tubing transmission line extending between the soft drink syrup container and the pump for carrying soft drink syrup, a second tubing transmission line for carrying soft drink syrup between the pump and the mixing station, and a third tubing transmission line extending between the mixing station and the soda pop dispenser for carrying soda pop to be dispensed;
    an optic sensor located and spliced in the first tubing transmission line for sensing when the first tubing transmission line is devoid of soft drink syrup, the optic sensor including a hollow housing with open ends and a through bore to transmit the soft drink syrup and a sensor portion mounted in the housing, the through bore of the housing mounted at an acute angle to the horizontal, and an inlet end of the housing, which receives soft drink syrup from the soft drink syrup container, located higher relative to the horizontal than an outlet end of the housing wherein soft drink syrup exits the housing to be carried to the pump, and at least a portion of the first tubing transmission line extending between the optic sensor and the pump is lower relative to the horizontal than the outlet end of the housing and the pump to create a trap area to prevent backflow of syrup from the pump to the optic sensor;
    a signal indicator electrically connected with the optic sensor for providing a signal indicating when the first tubing transmission line is devoid of syrup;
    a DC power supply; and
    a control unit electrically connected to the optic sensor and the signal indicator providing a voltage from the DC power supply.

2. The system for sensing empty soft drink syrup containers in a soda pop dispensing arrangement as set forth in claim 1 comprising:
    a plurality of soft drink syrup containers, pumps, and optic sensors in a manifold system so that a variety of soda pops may be dispensed from the soda pop dispenser.

3. The system for sensing empty syrup containers in a soda pop dispensing arrangement as set forth in claim 2 including a plurality of signal indicators, one local signal indicator located near and connected to each respective optic sensor for indicating when the respective soft drink syrup container is empty.

4. The system for sensing empty syrup containers in a soda pop dispensing arrangement as set forth in claim 3 including at least one remote signal indicator located near in view of the soda pop dispenser to provide a user of the dispenser with notice that at least one of the soft drink syrup containers is empty.

5. The system for sensing empty syrup containers in a soda pop dispensing arrangement as set forth in claim 4, wherein at least some of the signal indicators are LED lights.

6. The system for sensing empty syrup containers in a soda pop dispensing arrangement as set forth in claim 1 wherein the housing is mounted at an angle between 20° and 70° relative to the horizontal.

7. The system for sensing empty syrup containers in a soda pop dispensing arrangement as set forth in claim 6 wherein a housing is mounted at an angle of 30° to 60° from the horizontal.

8. The system for sensing empty syrup containers in a soda pop dispensing arrangement as set forth in claim 7 wherein the housing is mounted at an angle of approximately 45° from the horizontal.

9. The system for sensing empty syrup containers in a soda pop dispensing arrangement as set forth in claim 3 wherein the housing has a hollow generally cylindrical configuration including an outer wall and an inner wall, and the sensor portion is threaded into an opening extending through the inner and outer walls of the housing so that the sensing end of the sensor portion is exposed to soft drink syrup contained in the hollow of the housing.

10. The system for sensing empty syrup containers in a soda pop dispensing arrangement as set forth in claim 1 including two signal indicators, one local signal indicator being located near and in view of the optic sensor and a second remote signal indicator being located near and in view of the soda pop dispenser.

11. The system for sensing empty syrup containers in a soda pop dispensing arrangement as set forth in claim 1 wherein the pump is $CO_2$ driven with $CO_2$ from the $CO_2$ container and a $CO_2$ gas line extends there between.

12. A method for sensing empty soft drink syrup containers in a soda pop dispensing arrangement comprising the steps of:
providing at least one soft drink syrup container;
providing a mixing station for mixing water and $CO_2$ with soft drink syrup to make a soda pop mixture;
providing a pump for pumping soft drink syrup to the mixing station and beyond to be dispensed;
providing a $CO_2$ container to provide $CO_2$ gas;
providing a soda pop dispenser;
providing a first tubing transmission line extending between the soft drink syrup container and the pump for carrying soft drink syrup, a second tubing transmission line for carrying soft drink syrup between the pump and the mixing station, and a third tubing transmission line extending between the mixing station and the soda pop dispensing apparatus for carrying soda pop to be dispensed;
providing an optic sensor;
splicing the optic sensor in the first tubing transmission line;
providing the optic sensor with a hollow housing having open ends and a through bore to transmit the soft drink syrup and a sensor portion mounted in the housing;
mounting the through bore of the housing at an acute angle to the horizontal, and an inlet end of the housing, which receives soft drink syrup from the soft drink syrup container, located higher relative to the horizontal than an outlet end of the housing wherein soft drink syrup exits the housing to be carried to the pump;
mounting at least a portion of the first tubing transmission line extending between the optic sensor and the pump lower relative to the horizontal than the outlet end of the housing and the pump;
creating a trap area to prevent backflow of syrup from the pump to the optic sensor
providing a signal indicator;
electrically connecting the optic sensor with the signal indicator;
providing a DC power supply;
providing a control unit;
electrically connecting the optic sensor and the signal indicator to the DC power supply through the control unit;
sensing when the first tubing line is devoid of soft drink syrup using the optic sensor; and
signaling with the signal indicator when the first tubing line is devoid of syrup.

13. The method for sensing empty soft drink syrup containers in a soda pop dispensing arrangement as set forth in claim 12 wherein the system includes a plurality of soft drink syrup containers, pumps and optic sensors in a manifold system so that a variety of soda pops may be dispensed from the soda pop dispenser.

* * * * *

UNITED STATES PATENT AND TRADEMARK OFFICE
CERTIFICATE OF CORRECTION

PATENT NO. : 10,730,736 B1  
APPLICATION NO. : 15/938312  
DATED : August 4, 2020  
INVENTOR(S) : Kevin M. Candler and Mark Riddle Page 1 of 1

It is certified that error appears in the above-identified patent and that said Letters Patent is hereby corrected as shown below:

On the Title Page

Item (54) and in the Specification Column 1 Line 1, should be SODA POP SYRUP SENSOR and not SOAP POP SYRUP SENSOR.

Signed and Sealed this
Tenth Day of November, 2020

Andrei Iancu
*Director of the United States Patent and Trademark Office*